Dec. 13, 1966   W. V. EVANS, JR   3,292,069
TORQUE INCREASING DEVICE FOR A SERIES COMMUTATOR MOTOR
Filed Oct. 11, 1963
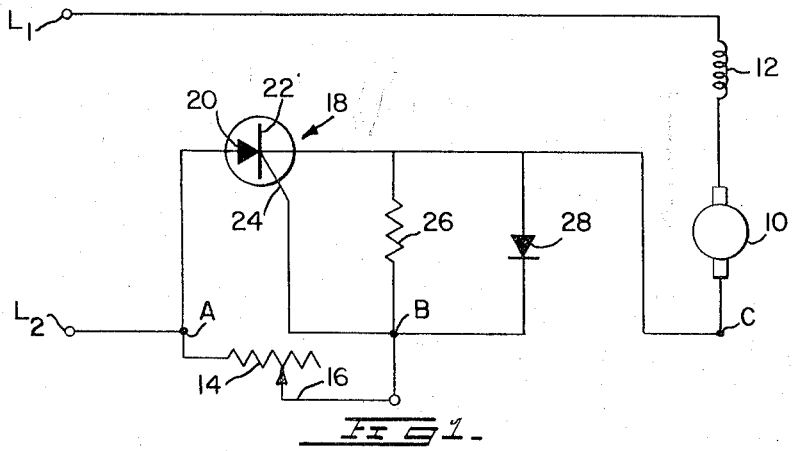
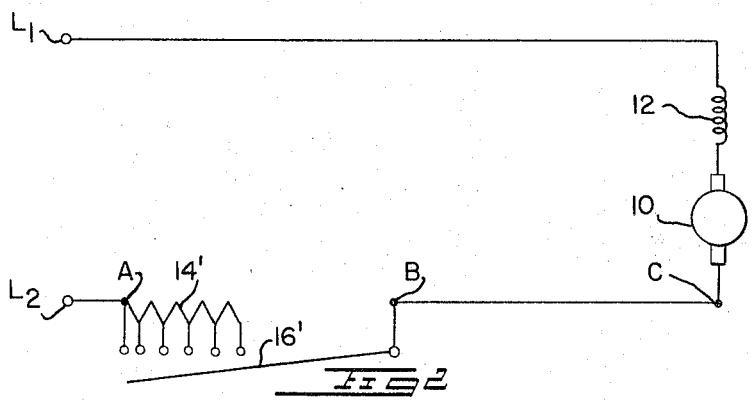
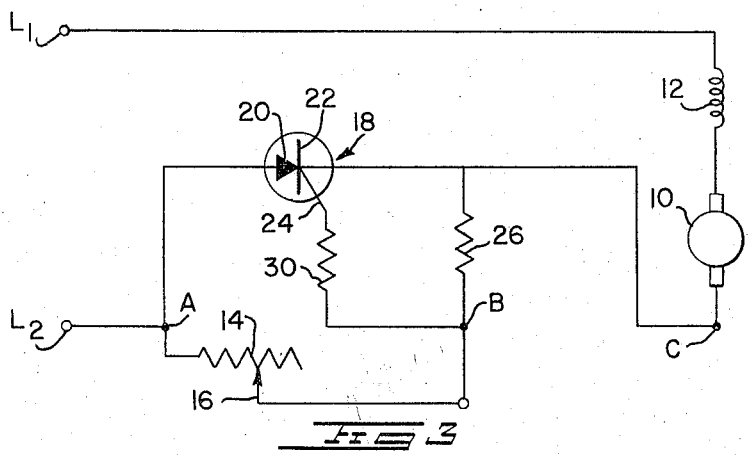
INVENTOR
WADE V. EVANS, JR.
BY *Stowell & Stowell*
ATTORNEYS.

United States Patent Office 3,292,069
Patented Dec. 13, 1966

3,292,069
TORQUE INCREASING DEVICE FOR A SERIES COMMUTATOR MOTOR
Wade V. Evans, Jr., Richmond, Va., assignor to Texaco Experiment Incorporated, Richmond, Va., a corporation of Virginia
Filed Oct. 11, 1963, Ser. No. 315,572
3 Claims. (Cl. 318—345)

The present invention relates to a method and means for providing simple and efficient torque control of universal fractional horsepower motors. More specifically, the present invention utilizes solid state controlled rectifier circuit means to provide increased torque characteristics for a universal series motor operated from a single phase A.C. line. The electronic circuit means employed in carrying out the present invention employ highly compact and relatively low cost elements which may be assembled in an auxiliary device and utilized to improve the overall torque characteristics of universal A.C. motors. Although the device of the present invention has some effect upon, and is used in conjunction with, elementary speed control means, its primary purpose and function is that of a torque boosting accessory to existing small universal motor devices and the speed controls nominally used therewith.

Small universal motors operating from a single phase A.C. line are well known in the art. Such motors are generally designated as being of the series type, that is, wherein the line voltage is applied across the motor armature with the field winding of the motor frame being connected in series therewith. Such motors are designated as "universal" in that they may be operated either from A.C. or D.C. line voltage sources. Small motors of this type, when operated from a single-phase A.C. line source, are generally provided with some method of controlling the speed characteristics thereof. Such characteristics are dictated by requirements of a reasonably wide range of speed control in certain applications, and the factor that the speed of such motors may not remain constant under various loading or torque conditions.

The universal motor has found wide use in many applications which require a high torque during starting and at low speeds. Since it is a series motor, it can operate over a much wider range of speed and torque than a shunt motor with a fixed field. Typical applications for small universal motors may include food mixers and blenders; hand tools, such as drills, sanders, saws, etc.; various home appliances; fans, blowers, and ventilating equipment; movie projectors; machine tools, such as lathes, grinders, etc.; hobby and toy devices; and processing machinery of various types.

In the present state of the art, the series motor for operation from an A.C. line source has been improved so as to establish reasonably high torque values during starting and at low speeds. However, due to the fact that the torque characteristics at starting speeds and at various running conditions under heavy load demands may often fail to meet requirements, it is an object of the present invention to improve such torque characteristics.

A series-wound fractional horsepower motor designed for operation from a single-phase A.C. line, as well as the so-called universal A.C.-D.C. motor towards which this present invention is particularly directed, both lack the starting torque characteristics of the analogous direct current series motor. This is due to the fact that the flux density in an A.C. motor must be kept low in order to prevent heavy hysteresis and eddy-current losses in the frame. In order to operate with reasonable power factors, the A.C. series motor must be designed to avoid high inductance losses in both the field and armature windings. However, for a most efficient operation, the low self-induction features work a disadvantage. In large alternating current series motors, the self-induction of the armature winding may be reduced by the use of a compensating winding on the field frame structure. Such a procedure, however, is inapplicable to the universal motor design due to the fact that both the small size of such motors and the economics prohibit the use of a compensating winding structure. Also, due to the fact that low flux densities are dictated for A.C. motor operation, it is a practice in large machines to employ armatures having a large number of conductors. Again, the small size and manufacturing economies mitigate against the use of such methods of increasing torque in the fractional horsepower universal motors of smaller sizes.

Therefore, it has become desirable to utilize various possible alternative methods to increase the torque in small motors of the type enumerated above. Various torque boosting techniques have been proposed, including the utilization of auxiliary D.C. voltages, pulsed operation, and methods of removing or minimizing the load under starting conditions by the use of clutch devices or the like. The latter method would be of little or no use under heavy load conditions at medium and upper speed ranges.

Due to various design conditions and marketing economy requirements, it may be necessary to utilize a series universal motor of reduced torque capacity in a particular application. In order to effect such economies, or in the event that a small universal motor does not have torque characteristics required by a particular application; or in the event that a manufacturer wishes to reduce the number of different motor models or designs in his line; it becomes quite important that the torque characteristics of the motors be utilized to their best advantage. Accordingly, it is an object of the present invention to provide methods and means for increasing the torque characteristics of motors of this type.

Small universal motors have many different types of application over a wide range of load and speed conditions. Typical uses for such motors have been outlined above. In the case of a small universal motor which is used on a sewing machine, when a sewing operation is begun at slow speed the initial loading may be such that the starting torque is very small. In accordance with the present invention, the starting torque for the motor may be increased by means of a simple auxiliary circuit. In addition to the advantage of increasing the torque when starting the sewing machine from rest, the present invention enables such motor to keep operating during periods of unusually heavy load demands without stalling. This would be the case when a sewing machine comes to a seam or any similar portion of thicker material while operating at reduced speeds.

Although the present invention, in its preferred embodiment, will be described as applied to a small universal motor driving a sewing machine or similar home appliance, it will be apparent to those skilled in the art that the invention is not limited to such a specific application.

An additional feature afforded by the present invention is that the means which increase or boost motor torque are automatically removed from the motor circuit when it is operating under or within the normal range of speed and load conditions. The overall effect of the circuit of the present invention is to increase the motor torque during starting and stall conditions of heavy load demands, and to let the motor operate normally after it has achieved running speed or under lighter load conditions.

The above and further objects and advantages of the invention will become more apparent from a consideration of the detailed description which follows, taken together with the accompanying drawings which illustrate various embodiments of the invention. Such illustrations are by way of example only, and are not to be construed as limiting the invention. In such drawings:

FIGURE 1 illustrates schematically one embodiment of the invention for providing a torque boosting system for a series commutator motor;

FIGURE 2 shows schematically a conventional prior art arrangement for a series commutator electric motor; and FIGURE 3 illustrates schematically a modification of the torque boosting circuit shown in FIGURE 1, which is the preferred embodiment of the invention.

Referring first to FIGURE 2, which shows a conventional prior art electric motor system, the series-connected motor elements consist of the armature winding 10 and field winding 12. A supply of alternating current, not shown, is connected to the terminals $L_1$ and $L_2$. The free end of the field winding is connected to terminal $L_1$ and the free end of the armature winding is brought out to a connection point C.

A speed controller consisting of a potentiometer resistance 14' and movable contact arm 16' is provided between the terminal $L_2$ and the armature connection C. The speed controller is inserted in series, with the resistance connection point A attached to terminal $L_2$ and the arm connection point B attached to the armature winding at connection point C.

In the motor arrangement of FIGURE 2 the speed controller is illustrated as utilizing a tapped potentiometer resistance element 14'. Contact arm 16' is spaced therefrom so as to provide an "off" switching action. When the motor arrangement is utilized to drive a sewing machine, the speed controller is constructed in the form of a pressure operated device with the contact arm spring-biased to the normally open-circuit or "off" position shown in the drawing. Contact arm 16' may be actuated by the sewing machine operator by the application of foot pressure or knee pressure, as is well known in the art. Pressure on the speed controller arm will first energize the motor to run at slow speed due to the maximum amount of inserted resistance. Progressive further movement of the arm by the operator will cause more of the resistance element to be shorted out to provide an increase in motor speed which reaches a maximum when all resistance is removed from the circuit and connection B is in contact with connection A. This applies full line voltage from terminal $L_2$ to the armature winding connection point C.

In accordance with the invention, improved torque may be obtained for the known series motor arrangement by means of the circuit illustrated in FIGURE 1. Both starting and running torque under loading are improved due to a boosting action as described hereinafter in explaining the operation of FIGURE 1.

Additional circuit elements consisting of a solid state controlled rectifier, a control or sensing resistor therefor, and a steering diode are provided in FIGURE 1. The controlled rectifier 18, which may be of the silicon type, has an anode element 20, a cathode element 22, and a gate element 24. The anode-cathode path of rectifier 18 is connected between terminal $L_2$ and the motor armature winding at point C.

The balance of the circuit arrangement shown in FIGURE 1, with the exception of the control resistor 26 and steering diode 28, follows the conventional arrangement of FIGURE 2, and like reference numerals have been used to designate similar elements and connection points.

An optional speed controller suitable for providing a continuously variable range of motor speeds is utilized as a preferred form in accordance with the invention. This consists of the continuously variable potentiometer resistance 14 and the movable contact arm 16. Arm 16 may be pressure operated and include an "off" position, as before. Obviously, this form of speed controller may be substituted in the motor system of FIGURE 2, if desired.

When the A.C. voltage applied to the line terminals $L_1$, $L_2$ is positive at terminal $L_1$ the steering diode 28 conducts for the entire positive half-cycle bypassing control resistor 26 and rectifier 18, and the motor operates in normal fashion solely under the control of the speed controller or rheostat means 14, 16. Current flow is from $L_1$ through field 12 and armature 10 to connection point C, and thence diode 28 to point B, and thereafter through arm 16 and resistance 14 to terminal $L_2$.

During alternate half-cycles when negative voltage is applied to terminal $L_1$ diode 28 is non-conducting, and motor current passes through control resistor 26 to connection point B. The voltage drop across resistor 26 is utilized to control the firing of the solid state controlled rectifier 18 by means of a connection from point B to the gate element 24; the opposite end of resistor 26 being connected to the rectifier cathode element 22 as shown. For the negative half-cycle, under normal running conditions of the motor, the current flow is from $L_2$ through resistance 14 and arm 16 to point B, then through control resistor 26 to point C, and thereafter through the motor armature and field windings to terminal $L_1$.

The voltage drop across control resistor 26 during the negative half-cycle is insufficient under normal motor operation to fire the rectifier. However, when operating conditions require a torque increase a heavier current is drawn by the motor, and the voltage at point B with respect to the rectifier cathode 22 is increased to a value which is sufficient to trigger the gate element 24 and fire the rectifier 18. The rectifier anode-cathode path, when thus conducting, short-circuits the speed controller rheostat and the full line voltage is applied to the motor for the negative half-cycle. With reduced resistance due to the bypassed speed controller the motor draws its maximum rated current and produces maximum torque.

It will be apparent that the present invention permits full rated torque for fifty percent of the motor duty cycle whenever load demands are increased, with a consequent improvement in operating characteristics. This is particularly true in the case of a sewing machine driven by the series commutator motor. When the operator starts a sewing operation and desires to have the needle advance slowly through the fabric, the speed controller rheostat is depressed a slight amount. At such time a boost in torque is generally required in order to overcome the initial motor inertia when starting from rest and the fabric resistance or loading. In order to obtain a torque increase from the series motor a heavier current must be drawn. However, this cannot pass through the series circuit due to the large amount of resistance inserted by the slow setting of the speed controller. A sufficient current increase occurs during the negative half-cycle to fire the rectifier and bypass the speed controller to produce the necessary torque.

An important feature of the invention is the automatic manner in which the motor torque is boosted only when required. As soon as the torque increase is sufficient to overcome the resistance or motor loading the current through the control resistor will diminish to a normal value which is insufficient to trigger gate element 24, the anode-cathode path of rectifier 18 will be opened, and speed control will revert back to the preset value of the resistance 14. However, if the sewing machine motor when running under control of the speed controller is overloaded, as when the needle comes to a seam, then the increase in armature current through the control resistor will cause the rectifier to fire and bypass the speed controller. When the motor loading is reduced the rectifier is automatically removed from the series circuit.

FIGURE 3 shows a simplified and lower cost torque boost circuit arrangement which is a modification of FIGURE 1. It is preferable in commercial forms of the invention to utilize lower cost circuit elements and also to increase the reliability of performance. To this end, in FIGURE 3 the steering diode has been omitted, and a current limiting resistor 30 has been inserted in the path between point B and the rectifier gate element. It has been determined that the steering diode is not required when the control resistor has a resistance value which is very small compared to that of resistance 14 and the motor impedance. Resistor 26 is chosen so that there is very little voltage loss due to its permanent inclusion in the series circuit. This permits the elimination of the steering diode.

Resistor 30, which limits the gate current, has a value which is determined by the gating or firing characteristics and ratings of the solid state controlled rectifier. By positively limiting the gate current increased reliability is afforded, and the torque boost circuit may utilize a lower rated and less costly rectifier since the resistor 30 protects it from possible damage occasioned by large load currents. Further, the value of the gate current limiting resistor may be determined, in part, by the resistance value of control resistor 26.

Values and ratings for the circuit elements to be utilized in carrying out the invention may be, for example, as set forth below, when operating a universal A.C.-D.C. motor of the sewing machine type which is rated for operation from 110-120 volts, 1-1.3 amperes, 1/7 horsepower, no load speed 15,000 r.p.m., full load speed 5,000 r.p.m., and a torque of 12 inch/ounces.

| | |
|---|---|
| Speed controller 14, 16 | 1000 ohms, 3 watts. |
| Resistor 26 | 1 ohm, 5 watts. |
| Resistor 30 | 500-700 ohms, 1 watt. |
| Diode 28 | 1N1116. |
| Rectifier 18 | General Electric Co., Type C20. |

The present invention relies upon the fact that both during starting and under unusually heavy or abnormal load conditions, the current drawn by the series motor is greater than that during normal running. This greater current gives a voltage drop across the control resistor means during one-half of the A.C. cycle. Such current through the control resistor means produces a voltage drop which is utilized as the gate signal for the solid state controlled rectifier element. Such voltage fires the rectifier which effectively shorts out the regular motor speed controller or rheostat means, by way of the parallel path between the rectifier anode and cathode. Such action provides full line voltage across the motor during that particular half-cycle regardless of the setting of the motor speed controller so as to increase the torque. During the other half-cycle, the diode means will bypass the control resistor and the motor will be under normal voltage control as determined by the speed controller element.

After the motor has started, the current drain will decrease, which will in turn decrease the gate firing voltage developed across the control resistor to a value such that the solid state controlled rectifier does not fire. When the firing voltage across the control resistor falls below the gate firing voltage requirements of the rectifier, the circuit will operate as though the latter was not present.

It should be noted that although the torque characteristic of series motors of this type is a rising one, the speed versus torque characteristic is a drooping one, and as the load is increased, the motor slows down markedly. To the extent that the present invention provides an increase in torque, it may be characterized as affording auxiliary speed control effects. However, the method and means of the present invention have a primary utility for producing increased torque characteristics in the small universal motor, and the speed controller for such a motor under most operating conditions is the sole speed regulater. Under normal running conditions of the motor, the circuit of the present invention is automatically removed from any controlling function, and the motor operates solely under the control of its usual rheostat means.

The circuit elements of the present invention are capable of being arranged in a separate auxiliary device. Such a device may be marketed as a separate accessory and is applicable to provide an improved torque characteristic to various applications of small universal motors. It is not normally necessary to make any changes in the arrangement of the small motor or of its speed controlling rheostat whether the latter is located within the motor housing or separated therefrom, so long as access may be had to the connection between the armature winding and the speed controller. In the case of a sewing machine where the speed controller is located at a position remote from the motor, the device of the invention may be inserted in the interconnecting wiring by splicing, or by the use of an adapter plug.

Although the device of the present invention affords certain improvements in the speed versus torque characteristics of small series motors, it should be emphasized that this is due primarily to its reaction upon the torque characteristics. The circuit of the present invention should be distinguished over the more complex arrangements known in the prior art which require the insertion of various sensing and control means within the motor electrical wiring between the armature and field terminals thereof. An obvious advantage of the present invention is the economies attendant thereto since it is not required that the electrical wiring connections between the field winding and the armature be broken within the motor housing; the entire device being external of the motor.

The method of increasing the torque under varying starting and load conditions in a small universal motor in accordance with the present invention is entirely automatic in principle and application, requiring no manual switching or other compensating action on the part of the motor operator. It is entirely determined by the current drawn by the motor under the starting or heavy loading conditions.

The device of the present invention, in its preferred embodiment, has been described as a self-contained auxiliary assembly or accessory which may be utilized with a sewing machine, food mixer or blender, hand drill, or the like. It will be apparent to those skilled in the art that the proposed circuit arrangement, due to both its simplicity which requires a small number of additional circuit elements, and its present small size, will suggest that such elements may be embodied within the structure of the motor housing or tool itself. Compact circuit elements commercially available may be fitted within the motor housing or attached to the motor or tool cover. Alternatively, the control elements of the present invention may be built into a separate motor speed controlling rheostat housing, as in the case of a sewing machine. The above and further modifications and embodiments of the present invention will be readily apparent to those skilled in the art and, therefore, such invention is not to be limited except as defined within the scope of the appended claims.

I claim:

1. A device for increasing the available torque of a speed-controlled commutator motor having series-connected armature and field windings adapted to be fed from an A.C. supply voltage source through a speed controlling rheostat series-connected between said source and said motor, said rheostat having a first supply voltage terminal and a second terminal; comprising, in combination, a control resistor, said resistor being connected between and in series with said second rheostat terminal and said motor and defining a first current path; a solid state controlled rectifier having an anode, a cathode, and a gate; said rectifier being connected with its anode-cathode path in shunt from said first rheostat terminal to said motor; and a second current path, said second current path connecting said gate and said second rheostat terminal.

2. A torque increasing device according to claim 1 further including a diode connected in shunt across said control resistor to bypass the same during predetermined half-cycles of said A.C. voltage.

3. A torque increasing device according to claim 1 including a current-limiting resistor in said second current path.

References Cited by the Examiner

UNITED STATES PATENTS

| | | | |
|---|---|---|---|
| 3,041,478 | 6/1962 | Gabor | 318—246 X |
| 3,103,618 | 9/1963 | Slator. | |
| 3,147,416 | 9/1964 | Grunbaum | 312—332 |
| 3,209,228 | 9/1965 | Gawron | 310—50 X |

ORIS L. RADER, *Primary Examiner.*

JOHN F. COUCH, *Examiner.*

S. GORDON, G. SIMMONS, *Assistant Examiners.*